United States Patent

Hill, Jr. et al.

[15] 3,673,247

[45] June 27, 1972

[54] HYDROXYBENZENSULFONYL HALIDE PRODUCTION

[72] Inventors: Harold Wayne Hill, Jr.; Robert W. Campbell, both of Bartlesville, Okla.

[73] Assignee: Phillips Petroleum Company

[22] Filed: March 11, 1969

[21] Appl. No.: 806,281

[52] U.S. Cl. ........................................................260/543 R
[51] Int. Cl........................................................C07c 143/70
[58] Field of Search ..............................................260/543 R

[56] References Cited

OTHER PUBLICATIONS

Fieser et al., Reagents for Org. Synth., p. 1247, Q 262E5.

*Primary Examiner*—Lorraine A. Weinberger
*Assistant Examiner*—E. Jane Skelly
*Attorney*—Young and Quigg

[57] ABSTRACT

The conversion of hydroxybenzenesulfonates to the corresponding hydroxybenzenesulfonyl halides by contacting with a thionyl halide, a phosphorus oxyhalide or a carbonyl halide in the presence of catalytic amounts of selected organic phosphorus compound.

7 Claims, No Drawings

HYDROXYBENZENSULFONYL HALIDE PRODUCTION

BACKGROUND OF THE INVENTION

This invention relates to a process for the preparation of hydroxybenzenesulfonyl halides. In accordance with another aspect, this invention relates to the conversion of hydroxybenzenesulfonates to the corresponding hydroxybenzenesulfonyl halides in the presence of selected organic phosphorus catalysts.

Hydroxybenzenesulfonyl halides, particularly para-hydroxybenzenesulfonyl halides, are homoreactive by virtue of the fact that the two functional groups, the sulfonyl halide and the hydroxyl groups, are highly reactive and readily combined; the order of reactivity being lowest for the fluorine derivative and increasing to a maximum for the iodine analog. A relatively stable sulfonyl halide, p-hydroxybenzenesulfonyl fluoride, has been prepared as described by Steinkopf, et al. J. prakt. Chem., 117, 1–82 (1927). However, attempts to prepare hydroxybenzenesulfonyl chloride, bromide, or iodide have been unsuccessful due to the high reactivity of the thionyl halide, phosphorus oxyhalide, or carbonyl halide with the hydroxyl group.

In accordance with the invention, we have found that novel hydroxybenzenesulfonyl halides, not heretofore prepared or isolated, can be prepared and recovered as essentially pure compounds by the unique process of this invention wherein hydroxybenezenesulfonyl halides are prepared using selected organic phosphorus catalysts.

Accordingly, it is an object of this invention to provide novel, useful hydroxybenzenesulfonyl halides.

It is another object of this invention to provide novel hydroxybenzenesulfonyl chlorides, bromides and iodides.

It is yet another object of this invention to provide a method for producing hydroxybenzenesulfonyl halides.

It is yet another object of this invention to provide a method for producing para-hydroxybenzenesulfonyl halides.

Other objects, aspects as well as the several advantages of the invention will be apparent to those skilled in the art upon reading the specification and the appended claims.

SUMMARY OF THE INVENTION

In accordance with the invention, hydroxybenzenesulfonates are converted to the corresponding hydroxybenzenesulfonyl halides by contacting the hydroxybenzenesulfonates with a halogen donor, preferably a thionyl halide, phosphorus oxyhalide or carbonyl halide, in the presence of a catalytic amount of a promoter comprising certain organic phosphorus catalysts.

In carrying out the invention it is presently preferred that the cation of the sulfonate be an alkali metal, more particularly sodium, potassium, lithium, rubidium and cesium. The halogen group of the resulting sulfonyl halide will, of course, be the same as that in the halogen donor, i.e., the thionyl halide, phosphorus oxyhalide or carbonyl halide. Due to the extremely high reactivity of the iodine derivative of the hydroxybenzenesulfonates, although all of the halogen analogs can be prepared by this procedure, we have found that the greatest degree of success in the preparation of these compounds is accomplished by the use of fluorine, chlorine and bromine donors, i.e., thionyl and carbonyl fluoride, chlorides and bromides and phosphorus oxychloride, oxyfluoride and oxybromide in the production of the corresponding sulfonyl fluorides, chlorides and bromides.

The selected organic phosphorus catalysts of the invention which can be employed are selected tri-substituted phosphoric acid, phosphine, or phosphine oxide derivatives which can be represented by the formulas:

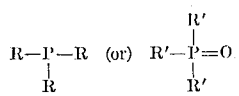

wherein R is alkyl, cycloalkyl, aryl, or combinations thereof, such as alkaryl, or aralkyl, having in the range of about 1 to 8 carbon atoms; and wherein R' is R, R—O—, or (R)2—N—. Such compounds include hexahydrocarbyl phosphoric triamides, trihydrocarbyl phosphates, trihydrocarbylphosphines, and trihydrocarbylphosphine oxides.

Representative examples of specific organic phosphorus compounds that can be employed as catalysts according to the invention include:
triphenylphosphine
triphenylphosphine oxide
hexamethyl phosphoric triamide
trimethylphosphine
trioctylphosphine
methyldioctylphosphine
methyldi(2-methylbutyl)phosphine
tricyclopentylphosphine
tricyclooctylphosphine
tribenzylphosphine
tri(2-phenylethyl)phosphine
tri(3-ethylphenyl)phosphine
tri(2-methylphenyl)phosphine
tri(2-methylcyclopentyl)phosphine
tri(4-ethylcyclohexyl)phosphine
tri(cyclopentylmethyl)phosphine
tri(2-cyclohexylethyl)phosphine
trimethylphosphine oxide
trioctylphosphine oxide
methyldihexylphosphine oxide
methyldi(3-ethylpentyl)phosphine oxide
tricyclopentylphosphine oxide
tricyclootylphosphine oxide
tribenzylphosphine oxide
tri(2-phenylethyl)-phosphine oxide
tri(3-ethylphenyl)phosphine oxide
tri(2-methylphenyl)phosphine oxide
tri(2-methylcyclopentyl) oxide
tri(4-ethylcyclohexyl)phosphine oxide
tri(cyclopentylmethyl)phosphine oxide
tri(2-cyclohexylethyl)phosphine oxide
hexaoctyl phosphoric triamide
hexacyclopentyl phosphoric triamide
hexacyclooctyl phosphoric triamide
hexabenzyl phosphoric triamide
hexa(2-phenylethyl)phosphoric triamide
hexa(3-ethylphenyl)phosphoric triamide
hexa(2-methylphenyl)phosphoric triamide
hexa(2-methylcyclopentyl)phosphoric triamide
hexa(4-ethylcyclohexyl)phosphoric triamide
hexa(cyclopentylmethyl)phosphoric triamide
hexa(2-cyclohexylethyl)phosphoric triamide
trimethyl phosphate
trioctyl phosphate
methyldioctyl phosphate
ethyldi(2-methylbutyl)phosphate
tricyclopentyl phosphate
tricyclootyl phosphate
tribenzyl phosphate
tri(2-pentylethyl)phosphate
tri(3-ethylphenyl)phosphate
tri(4-methylphenyl)phosphate
tri(2-methylcyclopentyl)phosphate
tri(3-ethylcyclohexyl)phosphate
tri(cyclopentylmethyl)phosphate
tri(2-cyclohexylethyl)phosphate.

The conversion of hydroxybenzenesulfonates to hydroxybenzenesulfonyl halides according to the invention can be represented by the following reaction:

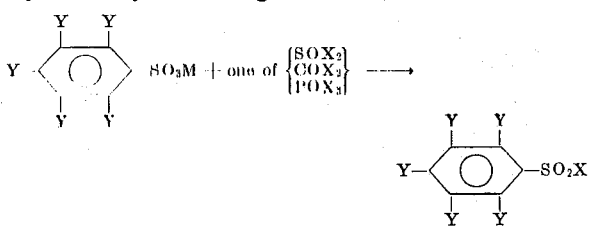

wherein M is Na, K, Li, Rb, or Cs; wherein X is Cl, F, or Br; wherein one and only one Y per molecule in —OH; wherein all other Y's per molecule are H or alkyl, cycloalkyl, aryl, or combinations thereof, such as alkaryl, or aralkyl, having in the range of about one to eight carbon atoms.

Representative examples of hydroxybenzenesulfonates which can be employed include:

sodium 4-hydroxybenzenesulfonate
potassium 3-hydroxybenzenesulfonate
lithium 2-hydroxybenzenesulfonate
rubidium 4-hydroxy-35-dimethylbenzenesulfonate
cesium 4-hydroxy-2,6-dibenzylbenzenesulfonate
potassium 2-hydroxy-4-cyclooctylbenzenesulfonate
potassium 2-methyl-3-phenyl-4-hydroxy-5-cyclopentyl-6-(2
—CYCLOHEXYLETHYL)benzenesulfonate
sodium 4-hydroxy-2,6-di(3-methylpentylbenzenesulfonate
sodium 4-hydroxy-2,6-diethylbenzenesulfonate
lithium 4-hydroxy-2,6-dioctyl-3,5-di(3-ethylphenyl)-benzenesulfonate
sodium 3-hydroxy-5-(4-ethyl cyclohexyl)benzenesulfonate
sodium 2-hydroxy-6-phenylbenzenesulfonate
potassium 4-hydroxy-2,6-diethylbenzenesulfonate
potassium 3-hydroxy-5-cyclopentylbenzenesulfonate
sodium 4-hydroxy-2,6-di(2-methylbutyl)benzenesulfonate Catalytic amounts of the catalysts of the class described above include those amounts of those catalysts sufficient to catalyze the desired conversion of sulfonate to sulfonyl halide within a reasonable period of time, while not exceeding concentrations above which homoreactivity of the hydroxybenzenesulfonyl halide products is substantially accelerated. Amounts of catalysts not exceeding about 25 parts by weight of catalyst per 100 parts by weight of hydroxybenzenesulfonate are normally suitable. In general, amounts of the range of about one to 15 parts of catalyst per 100 parts of hydroxybenzenesulfonate are most suitable. Of course, the optimum amount of the particular catalyst employed with the particular hydroxybenzenesulfonate under the particular reaction conditions employed can readily be determined by one skilled in the art, within the ranges defined.

Reaction temperatures in the range of from about 0° C. to about 100° C. are usually employed in this process although higher and lower temperatures can be employed. We have found, however, that temperatures within the range of about 50° C. to about 70° C. provide the most advantageous results under most circumstances. Though superatmospheric or subatmospheric pressures can be employed, the use of atmospheric or slightly higher pressures is generally preferred for convenience and prevention of reactor contamination.

The degree of conversion will, of course, depend on the duration for which the reaction is continued. Generally, reaction times within the range of about 1 minute to 20 hours are most suitable, preferably 1 to 10 hours are employed. Conventional equipment and conventional techniques can be employed to effect the desired conversion. Reaction can be carried out and equipment operated on continuous, semi-continuous or batch principles and techniques.

Mole ratios of the hydroxybenzenesulfonate to halogen donor are ordinarily in the range of 1:0.5 to 1:50, and are preferably in the range of 1:2 to 1:10.

product into a solvent such as benzene at a convenient temperature, say at about room temperature, cooling to solidify the solution, and then adding a second solvent (for example, hexane) that is substantially not a solvent for a hydroxybenzenesulfonyl halide but which is miscible in the solvent employed previously. The second solvent and the frozen mixture are allowed to equilibrate resulting in the separation of crystalline p-hydroxybenzenesulfonyl halide. Crystalline material of high purity has been obtained, using the above process, even when starting with crude oil-like products.

The hydroxybenzenesulfonyl halide products of the instant invention can be recovered by employing the crystallization process which is disclosed in copending application having Ser. No. 806,280, filed Mar. 11, 1969. In effect, that process comprises dissolving a crude hydroxybenzenesulfonyl halide The hydroxybenzenesulfonyl halides that are produced according to the process of this invention are useful as precursors to valuable polymers having regular repeating units characterized by the formula $$\left[ -O-\underset{}{\bigcirc}-\overset{O}{\underset{O}{\overset{\|}{S}}}- \right]$$

These poly(phenylenesulfonate) polymers have utility as films and fibers. A process for polymerization is disclosed in copending application having Ser. No. 806,282, filed Mar. 11, 1969, now U.S. Pat. No. 3,549,595.

The value and operability of the process of this invention are demonstrated by the following examples.

EXAMPLE I

At 60° C. to a stirred reactor were charged 9.8 g of sodium p-hydroxybenzenesulfonate and a mixture comprised of 30 g of thionyl chloride and amounts of catalyst as are presented in the following table, Table I. The reactor contents were stirred at 60° C. for 3½ hours, and were then slowly poured over ice water. An oily layer formed on the bottom and was taken up in dichloromethane. Further washing with water and dichloromethane was effected. The dichloromethane solution was dried with magnesium sulfate and the solution was stripped of volatiles. Product, in the yields given in Table I, below, was recovered in each run. The products were identified by infrared analysis to be composed of p-hydroxybenzenesulfonyl chloride.

This example demonstrates that hydroxybenzenesulfonyl halides are formed from hydroxybenzenesulfonates according to the process of this invention employing the catalytic compounds of this invention.

TABLE I

| Run No. | Catalyst | | Quantity of catalyst (g.) | Yield (g.) |
|---|---|---|---|---|
| 1 | Triphenylphosphine | 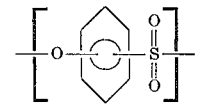 | 0.29 | 1.34 |
| 2 | Triphenylphosphine oxide | | 0.29 | 1.19 |
| 3 | Hexamethyl phosphoric triamide | $[(CH_3)_2N]_3PO$ | 0.29 | 0.51 |
| 4 | do | $[(CH_3)_2N]_3PO$ | 0.69 | 1.66 |
| 5 | None (control) | | | 0.0 |

EXAMPLE II

A stirred reactor maintained under $N_2$ was charged with 1.93 g of 4-hydroxybenzenesulfonyl chloride, 6 ml. of N-methylpyrrolidone, and 4 ml. of dimethylacetamide. Upon lowering the temperature to −35° C, 1.5 g of triethylamine was added. After 10 minutes reaction at −35° C, 200 ml of $H_2O$ was added and the polymer was filtered from the mixture. The polymer was washed with water, methanol, water, methanol, and repeatedly with hot acetone (50° C). The washed polymer was dried at 70° C for 16 hours to yield 1.05 g of dried polymer. The inherent viscosity of the polymer in LiCl-N-methylpyrrolidone was 0.60. A sample of this polymer was molded at 280° C, 1,500 psig for 30 seconds and quenched in cold water. Film had a thickness of 7 mils and a tensile strength of 6,885 psig with an elongation of 2 percent. The film was tough and clear.

We claim:

1. A process for producing hydroxybenzenesulfonyl halides which comprises reacting (a) a hydroxybenzenesulfonate, wherein the cation of the sulfonate is an alkali metal, with (b) a member from the group consisting of thionyl halides, carbonyl halides and phosphorus oxyhalides, in the presence of (c) an organo-phosphorus compound of the formula

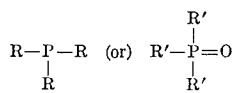

wherein R is alkyl, cycloalkyl, aryl, or combinations thereof, such as alkaryl or aralkyl, having in the range of about one to eight carbon atoms; and wherein R' is R, R-O-, or (R)$_2$-N-, wherein the amount of said organo-phosphorus compound is sufficient to catalyze the conversion of said hydroxybenzenesulfonate to said hydroxybenzenesulfonyl halide but does not exceed about 25 parts by weight of said organo-phosphorus compound per 100 parts by weight of said hydroxybenzenesulfonate.

2. A process according to claim 1 wherein the halides of (b) are chlorine, fluorine or bromine.

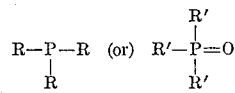

3. A process according to claim 1 wherein said hydroxybenzenesulfonyl halides are para-hydroxybenzenesulfonyl halides.

4. A process according to claim 1 wherein the amount of organic phosphorus compound present is an amount from one to 15 parts per 100 parts of said hydroxybenzenesulfonate.

5. A process according to claim 1 wherein said contacting is effected by the temperature in the range of about 0° C. to about 100° C.

6. A process according to claim 1 wherein (a) is sodium p-hydroxybenzenesulfonate and (b) is thionyl chloride and the product obtained is p-hydroxybenzenesulfonyl chloride.

7. A process according to claim 1 wherein (c) the organic phosphorus catalyst is triphenylphosphine, triphenylphosphine oxide, or hexamethyl phosphoric triamide.

* * * * *